United States Patent [19]

Christensen et al.

[11] Patent Number: 4,918,362
[45] Date of Patent: Apr. 17, 1990

[54] METHOD OF GUIDING INDUSTRIAL TRUCKS HAVING AT LEAST ONE STEERABLE WHEEL AND SYSTEM FOR CARRYING OUT THE METHOD

[75] Inventors: Sven Christensen, Hamburg; Rolf Haelbich, Halstenbek; Jürgen Hänel, Hasloh; Siegfried Hoener; Volker Pridat, both of Hamburg, all of Fed. Rep. of Germany

[73] Assignee: Firma Jungheinrich Unternehmensverwaltung KG, Hamburg, Fed. Rep. of Germany

[21] Appl. No.: 285,096

[22] Filed: Dec. 15, 1988

[30] Foreign Application Priority Data

Dec. 18, 1987 [DE] Fed. Rep. of Germany ....... 3743016

[51] Int. Cl.$^4$ ................... B64C 13/18; G05D 1/02
[52] U.S. Cl. .................... 318/587; 180/168; 180/169; 318/580; 364/424.01; 364/424.02
[58] Field of Search ........... 318/587, 632, 568, 580; 364/424.01, 424.02, 513; 180/167, 168, 169; 901/1, 7, 14

[56] References Cited

U.S. PATENT DOCUMENTS

| 3,245,493 | 4/1966 | Barrett | 180/168 |
| 3,738,443 | 6/1973 | Kubo | 318/587 X |
| 4,258,813 | 3/1981 | Rubel | 318/587 X |
| 4,566,032 | 1/1986 | Hirooka et al. | 180/169 X |
| 4,577,140 | 3/1986 | Schmidt et al. | 318/587 |
| 4,716,530 | 12/1987 | Ogawa et al. | 318/587 X |
| 4,736,812 | 4/1988 | Livneh | 180/168 |

FOREIGN PATENT DOCUMENTS

| 0116114 | 9/1981 | Japan | 318/587 |
| 0100509 | 6/1982 | Japan | 318/587 |
| 0106906 | 7/1982 | Japan | 318/587 |
| 0147715 | 9/1982 | Japan | 180/169 |
| 0151610 | 9/1983 | Japan | 318/587 |
| 0214918 | 12/1984 | Japan | 318/587 |
| 0100813 | 5/1986 | Japan | 318/587 |
| 0206009 | 9/1986 | Japan | 318/587 |
| 0026513 | 2/1987 | Japan | 318/587 |

*Primary Examiner*—William M. Shoop, Jr.
*Assistant Examiner*—Paul Ip
*Attorney, Agent, or Firm*—Toren, McGeady & Associates

[57] ABSTRACT

An industrial truck comprising at least one steerable wheel is to be guided in dependence on direction-controlling signals which are transmitted to the industrial truck. At a junction the truck receives a direction-controlling steering signal, which causes the at least one steerable wheel to be laterally offset from the guiding signal line until a signal equilibrium which depends on the offset has been established in the steering controller. In dependence on the distance traveled and/or on time, a resetting signal is received which causes the steering means to return to an operating condition in which the vehicle is centered over a signal guiding line to be followed. The signals are transmitted by a guiding signal line, which is buried in the ground and cooperates with a sensor, which is provided at the center of the vehicle and scans the guiding signal line so as to control the deflection of steerable wheels of the vehicle. When a branch to the left or right extends from the straight guiding signal line, a signal calling for a lateral offset from the guide wire (4; 15, 16) is delivered and maintained for causing the vehicle to move along a course that is parallel to the guide wire (4; 15, 16). That parallel offset travel is continued until a signal for resetting the vehicle to a centered position over the guide wire is received.

11 Claims, 7 Drawing Sheets

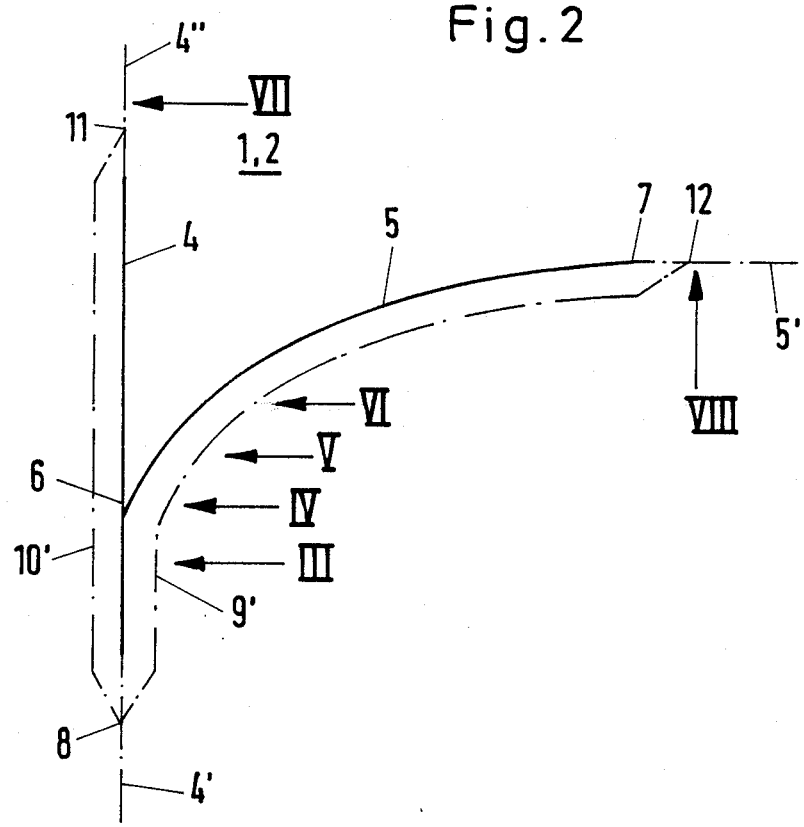
Fig. 2
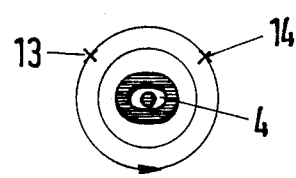
Fig. 3 (III)
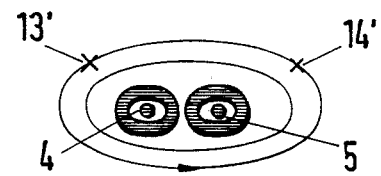
Fig. 4 (IV)

Fig. 5 (V)
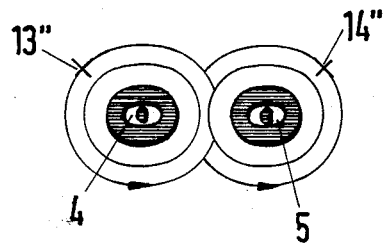
Fig. 6 (VI)
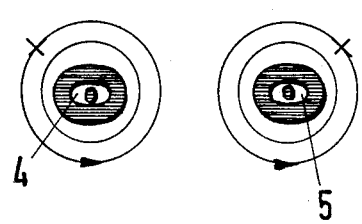
Fig. 7 (VII)
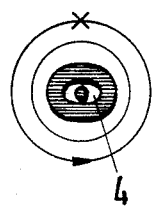
Fig. 8 (VIII)
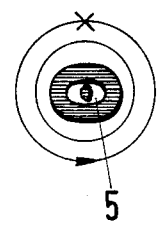

(X)

(XI)

(XII)

(XIII)

(XIV)

(XV)

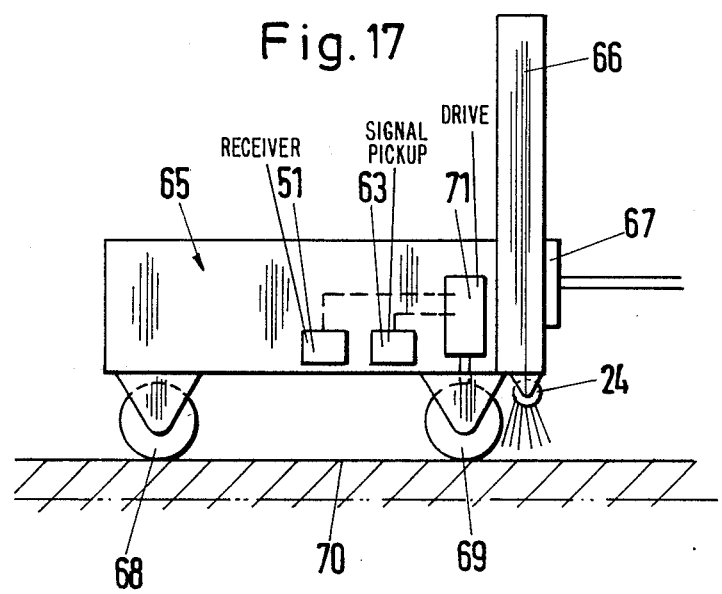
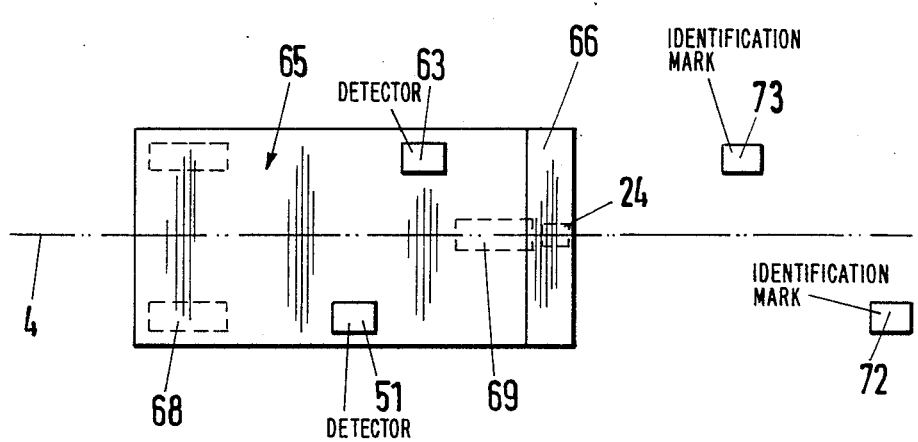

METHOD OF GUIDING INDUSTRIAL TRUCKS HAVING AT LEAST ONE STEERABLE WHEEL AND SYSTEM FOR CARRYING OUT THE METHOD

BACKGROUND OF THE INVENTION

1. Field of the Invention

This invention relates to a method of guiding industrial trucks having at least one steerable wheel, wherein a direction-controlling signal is transmitted to the industrial truck.

The invention relates also to a system for carrying out a method outlined herein in order to guide industrial trucks having at least one steerable driven wheel and a sensor, which is disposed at the center of the truck and cooperates with a guiding signal line in or on the ground and serves to scan the guiding signal line and is connected to steering means for controlling the deflection of steerable vehicle wheels. The guiding signal line is provided with branch lines for a deflection toward the left or right from a straight course.

2. Description of the Prior Art

Such systems are known in numerous forms, including systems having branch lines. Attention is directed in that connection to German Pat. No. 1,806,750. The system disclosed there has the disadvantage that control means must be associated with each of the guiding wire sections which have been laid in the ground. Owing to branches and junctions it is necessary to provide signal receivers which can selectively be enabled. The signal receivers are disposed in part in the ground at the point of intersection or at the point where a decision is to be taken and will respond to a signal from the vehicle in that a conductor section which was previously deenergized is now reenergized. This will permit of changing control actions. In the known system the first and second line sections at a crossing may be substantially parallel and may be connected by a bistable circuit to a course-defining conductor and may include each a monostable circuit for actuating an associated bistable circuit. This arrangement gives rise to considerable problems.

A system for guiding industrial trucks in accordance with the above explanations is also described in German Pat. No. 1,530,894. In connection with switchless junctions that publication deals specifically with the guidance of a vehicle having a mechanical connecting element, which is preset to a predetermined direction by a program control, which is initiated by detectors when they are disposed before a junction in the longitudinal guide for the stacking truck. That design permits a particularly favorable adaptation of a steering system and the detectors may be responsive to elevations, depressions or selective influences of that kind.

It is also known to provide a control system for a self-contained route system, which is described as a network and includes a plurality of switches or junctions, each of which permits a selection of two directions, and which also includes vehicles which are provided with a destination selector provided with memories and adapted to designate a given destination zone of the route system. The selection of the destination zone is a particularly important feature also in the present application.

The known system also comprises actuating means for selecting a direction in the area covered by the routes. A destination selector is provided with motor-controlling means, particularly for stopping the travel motor. The steering motor may also be controlled for an adjustment of a predetermined deflection. This can easily be achieved if, in the known system, each switch or junction is provided with a certain code for selecting a direction and the vehicle is provided with a receiver in conjunction with a comparator.

That known embodiment is provided at each switch with a transmitter having a predetermined code, which constitutes a constant signal train consisting of a predetermined number of signal steps, which are selectively provided with various signal marks, particularly signal pulses. A destination mark is provided by an additional signal within a signal step in a region in which there are no signal pulses. In that case the vehicle is provided with a comparator, which is provided with the destination code and receives signals, a zone signal train having a number of signal steps is provided for a network and the number of signal steps is at least as large as the number of possible destination zones in that network. That system can be controlled with very high accuracy. The system may be divided into various regions so that the route system is divided into a plurality of interconnected networks, and an additional network signal train comprising signal steps in a number which is at least as large as the number of networks is provided for such networks.

Such a control system provided with a destination code affords the advantage that a vehicle may selectively be provided with a starting code and when the latter has been activated a control will be effected by the destination code.

In a system for guiding industrial trucks, a block post control may be performed in accordance with German Pat. No. 1,806,750. But that would be inconsistent with the principle underlying the present application, in which the parts buried in the ground are set to and maintained in a predetermined state.

If a junction is provided in accordance with the invention and a branch guide wire departs from the normal guide wire, that branch guide wire may be separately energized. That energization is constant and will not be changed in dependence on the passage of the vehicle, which will be controlled by the direction-presetting subassembly for controlling the direction in which the vehicle is to be steered to either follow a branch or to go ahead on the previous course.

SUMMARY OF THE INVENTION

It is an object of the invention so to improve a method and a system of the kind described first hereinbefore that the structural expenditure such as is usual with block posts will be reduced and the reliability of the travel will be higher than with the known softly acting control systems and industrial trucks will be guided in such a manner that a reliable guidance of the industrial truck along a straight or branch course will be ensured even under adverse operating conditions resulting in that the signals from the ground are unreliable owing to the presence of dirt.

It is believed that such an arrangement could not have been imagined before.

That object is accomplished in accordance with the invention in that the industrial truck receives from a guiding signal line a direction-controlling signal, which causes that at least one steerable wheel to be laterally offset from the guiding signal line to such an extent that a signal equilibrium depending on the desired offset has been established in the steering controller, a reset signal is received in dependence on the length of travel and/or time and causes the steering means to return to an operating condition in which a guiding signal line can directly be followed.

Even when the guide wire is provided with branches, which deliver equal guiding influences for controlling a direction-presetting subassembly provided on the industrial truck so that a controlled deflection will be effected, that arrangement will ensure that the deflection through the preset angle will be effected and a lateral offset for guiding the industrial truck in the inductive guiding area will be maintained.

By an initial initiation and by the provision of a steerable driven wheel the invention provides a system in an embodiment in which the steerable driven wheel is offset from the guiding wire to a preselected side and with that offset is guided parallel to the guide wire until a signal effecting a return movement to the guide wire has been received. This will depend on the travel time and the length of travel as controlling variables.

In accordance with the invention an industrial truck is surprisingly employed which has a steering subassembly which by a direction-presetting subassembly can be controlled in dependence on time or length of travel. In that manner a control action for a short or restricted time can be initiated. The steerable wheel is subsequently reset to a position in which it is parallel to a guide wire.

In front of a junction, identification marks provided with an address of the junction are suitably provided in the ground, in dependence on a signal received from said identification mark a controlling variable is delivered to the steering means of the system in order to guide the vehicle on a laterally deflected course, and a signal generator is provided for terminating the lateral deflection so that the vehicle then travels along an offset course. In that embodiment the vehicle can directly be guided in dependence on the direction-controlling signal which is transmitted.

Direction-presetting subassemblies are suitably triggered by marks provided along the route.

It is particularly preferred that the direction-presetting subassembly associated with a steerable wheel effects in dependence on a signal equilibrium a lateral deflection of the steerable wheel and subsequently the setting of said wheel to a position in which said wheel is parallel to the guide wire. The direction-presetting subassembly comprises control signal generators, which can be changed in state and may cause the vehicle to travel parallel to the guide wire at a certain distance therefrom for a measured time or length of travel. It is emphasized that the signal equilibrium will determine the offset and a time- or travel-dependent control is effected for controlling the duration of the travel along the laterally offset course.

In that context a suitable embodiment of the invention comprises a timing control, which is triggered as the vehicle enters a junction and which is adapted to be turned off after a predetermined time. That turning off will result in a return of the vehicle to a centered position over a guide wire to be scanned. In another preferred embodiment a control is effected in dependence on the length of travel and is initiated as the vehicle enters a junction and is terminated after a predetermined travel. The termination will result in a return of the vehicle to a centered position over a guide wire to be scanned. A travel transducer is suitably provided and is adapted to be started by a switch in dependence on a signal receiver via a course-selecting subassembly and a selector switch.

In a particularly desirable embodiment of the invention, the industrial truck is provided with a plurality of, preferably with three signal generators for the steering means, each of said signal generators comprises a comparator for receiving the signal from the sensor and from an associated signal source, one of said signal sources control the travel of the vehicle when it is centered over a guiding signal line whereas the two other signal sources control the lateral deflection resulting in a travel along a laterally offset parallel course.

That evaluation of the signals from particularly three signal generators will result in a particularly exact control. That control will be improved by particularly three comparators, which are connected in parallel and have each an input that is connected to a sensor and another input that is connected to a signal source, which signal sources respectively deliver a signal for a straight-ahead travel, and signals for a deflection to the right and left. The expression "particularly" indicates that more than three signal generators and more than three comparators may be provided.

The plurality of, particularly three comparators may be succeeded by a switch control circuit, which is adapted to be triggered by a signal that is generated in response to an external identification mark and after an evaluation of that signal in accordance with a route program will actuate one of the switches in a closing sense. As a result that mark which is associated with the comparators or with the routes associated with them can be reached with a minimum expenditure of external means.

In a particularly preferred embodiment designed in view of the above, one signal generator group for indicating the end of the offset travel is provided and is connected to the switch actuator and is also connected to the route-finding subassembly and is selectively connectable to a triggering device, which includes a signal mark in the ground and an associated receiver on the vehicle and also comprises a travel transducer on the vehicle and a time sensor on the vehicle. In that case a travel along a deflected course, which in accordance with the above explanations has been effected as a result of a steering signal can be succeeded by a travel of said at least one steerable wheel along a course that is laterally offset from the guiding signal line until that offset travel is terminated by a special signal that is generated by the steering controller.

Sensors mentioned hereinbefore in connection with the invention may be designed in various ways.

A preferred feature of the invention resides in the use of a sensor which is known per se from Published German application No. 2,752,027. That sensor comprises at least two coils, which are respectively vertically and horizontally oriented and are disposed substantially on the same level on the vehicle. In such a crossed-coil sensor the phase difference between the first signal induced in the first coil and a second signal induced in the second coil is transformed by a phase rotation to a third signal, which is used as a correcting variable for a part of the steering means of the vehicle. Crossed coils such as have been described as first and second coils are particularly preferred means because fields which are due to branches, particularly at junctions, will offset each other in that case.

The above reference to block posts, which are turned on in a controlled manner, includes an arrangement in which a turning-on in a controlled manner will be avoided in that a guide wire section adjacent to a junction is connected to a separate power source.

BRIEF DESCRIPTION OF THE DRAWING

FIG. 2 is a top plan view showing a routing arrangement including a guide wire and a junction.

FIGS. 3 to 8 are vertical sectional views showing guide wires in a routing arrangement as shown in FIG. 2.

FIG. 17 is a diagrammatic side elevation showing an industrial truck disposed over a guiding signal line 4.

FIG. 18 is a diagrammatic top plan view associated with FIG. 17.

DETAILED DESCRIPTION OF THE PREFERRED EMBODIMENTS

The invention will be explained hereinafter with reference to the diagrammatic drawings.

Figure 1:
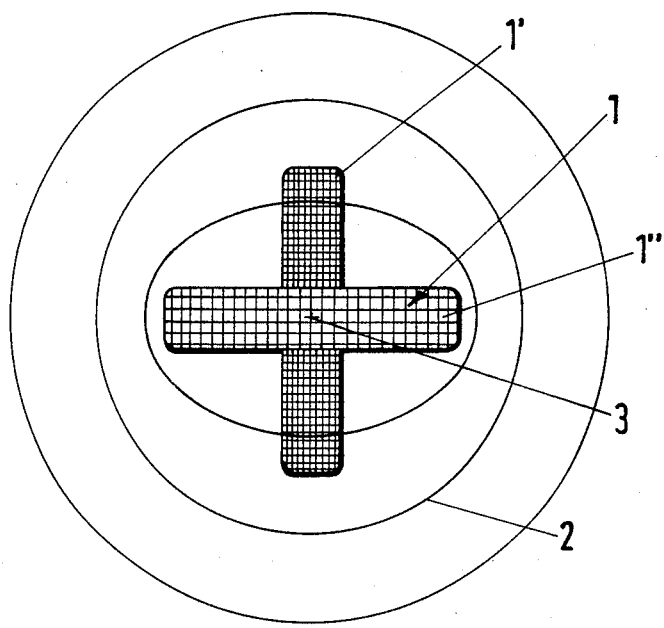
FIG. 1 is a sketch illustrating the principle of a crossing-coil sensor.

FIGS. 1 to 15 illustrate the principles to be adopted. FIG. 1 shows a crossed-coil sensor 1 disposed in a field 2 around a central conductor 3. In the literature mentioned hereinbefore it has been stated that such crossed-coil sensor affords special advantages regarding an exact detection of the states of the field and changes of said states because opposing influences on the two coils 1', 1" extending at right angles to each other will offset each other so that a particularly exact control will be enabled.

FIG. 2 illustrates a straight guiding signal line 4 and a branch guiding signal line 5. In view of the explanations given hereinbefore it is stated here that each guiding signal line may consist of an electric conductor, which has been buried in the ground and which when flown through by a current will establish a field. The illustrative embodiments will be described in connection with that assumption.

But the expression "guiding signal line" covers also routing means which are provided on the ground and which can be optically scanned or can be capacitatively scanned, in dependence on the material employed. For an optical scanning, optical sensors may be provided, which generate electric control pulses in response to the received radiation which has been reflected by the guiding signal line. Similar remarks are applicable to a capacitive scanning. In that case a guiding signal foil or a corresponding strip may have been laid on the ground and the vehicle will carry a second electrode disposed over said foil or strip.

In a usual arrangement, known per se, the induced field will be scanned.

For this reason, reference to a guide wire 4 and a branch guide wire 5 will be made in the subsequent description of the illustrative embodiments although the other guiding means may also be included in the embodiments.

The branch guide wire 5 may be connected by a soldered joint at 6 and will then be supplied with the same power as the guide wire 4.

Alternatively, the end 7 of the branch guide wire 5 may be disconnected from the continuous guide wire 4 and may be connected to a separate power source. The evaluating means will then effect a processing in dependence on the parameters of scannable signals which are detected. In this manner special operations can be performed and commands can be given. Even if the same power is supplied to both guide wires, signal information may be furnished by superposed frequencies, which will then be filtered out.

For the sake of simplicity it will be assumed hereinafter that the branch guide wire 5 is connected to the same power source as the guide wire 4.

Certain sections of the guide wires 4 and 5 are disposed in a controlling region. It is apparent that the guide wire 4 is connected to a preceding wire section 4' and a succeeding wire section 4" and the guide wire 5 is connected to a succeeding wire section 5'. As a result, the guide wires 4, 5 and the joint 6 constitute a group within the connected wire sections 4', 4", 5'. A junction group including the guide wires 4, 5 and the joint 6 is preceded by a control point, which receives a signal from a signal generator of the vehicle or is triggered by a signal generator such as is disclosed in German Pat. No. 1,530,894.

This will result in the generation of a command for a lateral deflection through a limited angle to the right or left. As a result, the center of the vehicle which initially moved over the guide wire 4, e.g. over the section 4', will be laterally displaced to the right or left to reach an offset course 9' on the right or 10' on the left. When said offset course 9' or 10' has been reached, the sensor mounted on the vehicle will evaluate the signals received from the guide wires 4, 5 in such a manner that the laterally offset center of the vehicle will travel on one of the offset courses 9' and 10'.

After that lateral deflection to an offset course on one side or the other the vehicle will either follow the guide wire 4 along a straight line to reach the section 4" or will follow the guide wire 5 to reach the section 5'. When the offset course has been traversed the travel along the offset course will be terminated at the point 11 or 12 and the center of the vehicle will then be disposed again over the guide wire 4 or 5, specifically over its section 4" or 5'.

The travel along the offset courses 9' and 10' will ensure that the intended route will be followed.

It is apparent from FIGS. 3 to 8 that a reliable guidance of the vehicle along the intended route will be ensured in one embodiment if only one sensor is used in order to avoid control errors.

Figure 16:
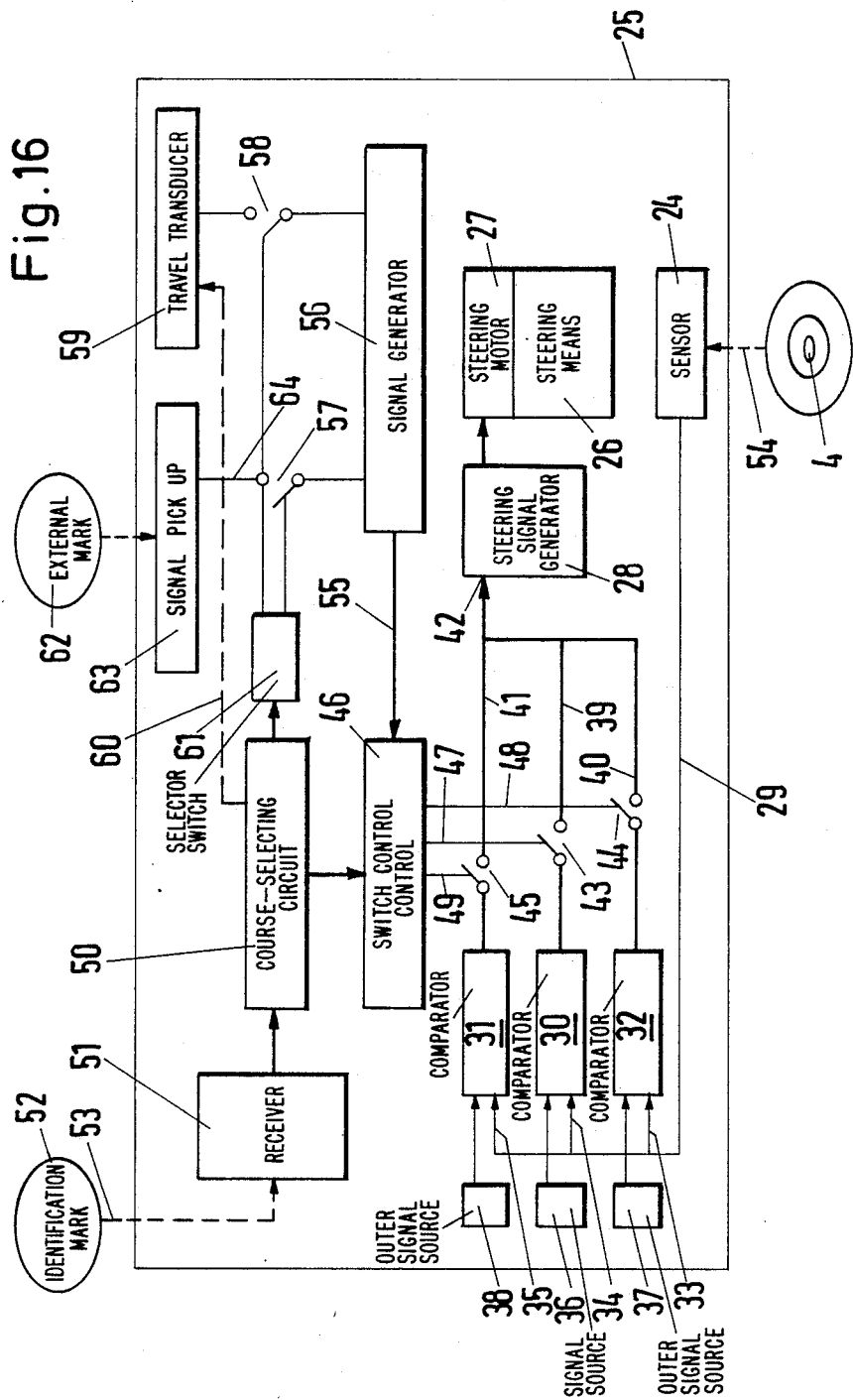
FIG. 16 is a circuit diagram of a system which is designed in accordance with the preceding figures and serves to steer a vehicle.

From FIG. 3 it is apparent that the sensor at 13 or 14 is laterally offset from the center line over the guide wire in the plane indicated by the arrow III in FIG. 2. The distances from the points 13 and 14 to the guide wire 4, i.e. to the center of the arrangement shown in FIG. 3, are the same, but for a travel along a straight-ahead course or a branch course the sensor x must be laterally offset from the guide wire from 13 to the left or from 14 to the right. As a result, different signal parameters will be picked up and delivered to the control system. The evaluation will be described with reference to FIG. 16.

Similarly, FIG. 3 shows the two guide wires 4 and 5 in the plane indicated by the arrow IV in FIG. 2. The line which is scanned by the sensor provided on the underside of the vehicle extends through point 13' or 14'. The distances from both points to the adjacent guide wire are the same, but are measured in different directions.

The same remarks will be applicable to the position shown in FIG. 5 in the plane that is indicated by the arrow V in FIG. 2. It is apparent that the sensor x is disposed at 13" or 14", i.e., on the outside of a guide wire 4, 5 or adjacent guide wires and will follow their course so that the vehicle will be steered accordingly. In that connection the sensor action is influenced by the configuration of the lines of force, for reasons of safety, because the lines of force have different directions with respect to the sensor at 13" and 14".

In accordance with FIG. 6, in the plane indicated by the arrow VI in FIG. 2 the guide wires 4 and 5 have such a large spacing from each other that the fields established around said wires are separated from each other and the sensor can be influenced only by one field at a time. This will result in a steering of the vehicle along a definite course.

In FIG. 7 it is apparent that in the plane designated by the arrow VII in FIG. 2 the guide wire 4 is continued by a straight section 4". After a travel of the vehicle along the offset course 10' beyond the return point 11 the sensor disposed at the center of the vehicle is again over the guide wire 4 for guiding the vehicle. FIG. 8 shows the corresponding arrangement adjacent to the guide wire 5, specifically adjacent to the section 5', so that the vehicle will travel along a straight line beyond the point 12 with the centrally disposed sensor arranged over the guide wire 5. The resetting from the laterally offset course will be effected by a time- or travel-dependent control, which will be explained with reference to FIG. 16. The laterally offset travel is performed only to ensure a reliable performance of the branching operation adjacent to a junction.

Figure 9:
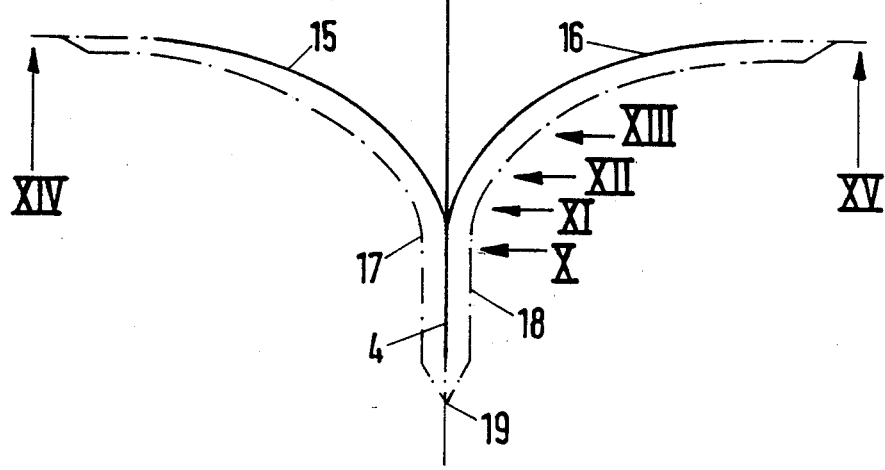
FIG. 9 is a basic top plan view showing a routing arrangement having branches on opposite sides.

The above remarks are also applicable to the embodiment shown in FIG. 9 and the figures related thereto. Whereas the straight guide wire is again designated 4, the guide wire of one branch is designated 15 and that of the other branch is designated 16. In the embodiment shown in FIG. 9 comprising branches on both sides the sensor, not shown, which is provided on the vehicle, will remain over the guide wire 4 or a corresponding guiding signal line during a travel on a straight course. Only when the signals call for a deflection to the left or right will a lateral offset be effected and will result in a travel along a laterally offset course 17 or 18 in dependence on the direction of the branch to be used. As a result, the sensor carried by the vehicle will be offset from the point 19 to travel to an offset course when a branch is to be used.

The travel along said laterally offset course 17 or 18 will be initiated at 19 either because the branch is indicated to the vehicle by signals from an external identification mark or because the lateral offsetting is initiated by an internal programmed signal generator.

Figure 10:
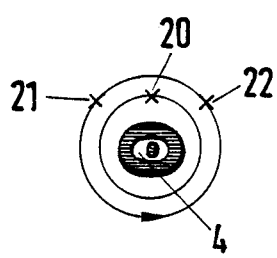
FIGS. 10 to 13 are sectional views taken in the direction of arrows X to XIII, respectively, in FIG. 9.

In FIG. 10 the sensor x is shown at 20, still on a straight course over the guide wire 4. But when a control action had been effected at 19, the sensor x may be disposed at 21 for a travel to the left along an offset course 17 or at 22 for a travel to the right along an offset course 18 rather than at 20.

Figure 11:
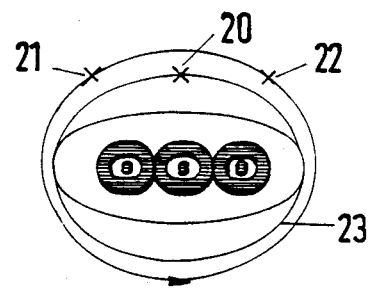

These conditions will be maintained in the region shown in FIG. 11. Because the three guide wires are closely spaced in that region, a common field 23 will still be established. But even that field will exert different influences on the sensor at 20, 21 or 22 so that a travel along an offset course or a straight-ahead course will be ensured.

It is emphasized that a sensor at 20 will be controlled in such a manner that the highest possible control power will be received by the sensor so that a control action tending to move the vehicle toward the center will be effected in response to a decrease of the power received on one side or the other.

A different mode of operation will be adopted when the sensor is disposed at 21 or 22. As the vehicle is deflected to the outside, the power which is received by the sensor will decrease. For this reason a different control action is effected for the sensor disposed at 21 or 22. In that case the sensor will pick up an intermediate power for its steering action and will use that power as a controlling signal in that an increase of the power will result in a guidance of the vehicle toward one side and a decrease of power will result in a steering of the vehicle toward the other side and an equilibrium will thus be established. In that case, changing conditions are utilized for a steering action to different sides. On the other hand, when the sensor is disposed at 20 a decrease of power will always induce a correcting steering action in a sense to increase the power that is picked up.

Figure 12:
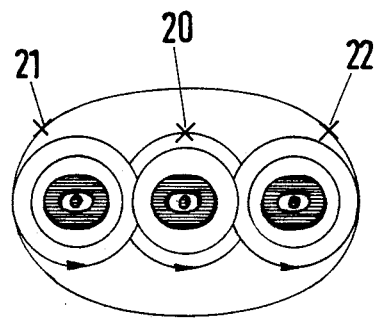

FIG. 12 is a sectional view taken on the plane that is indicated by the arrow XII in FIG. 9 and shows corresponding positions of the sensor over three guide wires which are more widely spaced apart. Similar remarks are applicable to FIG. 13.

Figure 13:
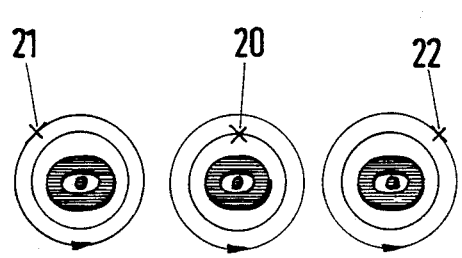
Figure 14:
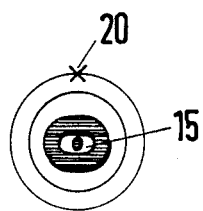
FIG. 14 is a sectional view taken on the line XIV—XIV in FIG. 9.
Figure 15:
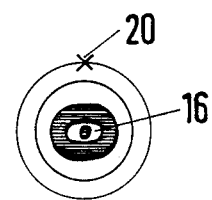
FIG. 15 is a sectional view taken on line XV—XV in FIG. 9.

In the position shown in FIG. 13 the sensor x as a result of the preceding steering action is at one of the positions 21, 20 and 22 and is thus associated with a certain guide wire or guide wire section. The previously common field has now been divided into three separate fields and the offset from the branch wire sections to the outside will result in signal parameters which will reliably ensure the travel along the desired branch. This is reflected in FIGS. 14 and 15, in which the sensor x is shown at 20 over the guide wire 15 or 16.

The travel along the offset courses 9', 10', 17', 18 ensures that a particularly reliable offsetting will be effected by simple means in such a manner that the influences of dirt on flooring or optical guide means and the like will be eliminated and such optical guide means may be employed. This will be ensured even if the offset courses are laterally offset from the guide wires only by a distance of an order of 20 to 120 mm. In case of trucks which are used in warehouses and may have a width of 2 meters, an offset having an order of, e.g., 50 mm will require only a very small floor area but will result in a surprisingly large improvement of the reliability of the guidance at junctions.

Only the guiding signal lines consisting of guide wires and the guidance of a vehicle by means of a centrally disposed, downwardly facing sensor have been described. The control points 8 and 19 from which the laterally offset courses depart have been shown. Subject matter which has not been shown is apparent from the prior art discussed hereinbefore and relates to marks on the ground which are used to initiate a control action by mechanical, optical or electric signals or by a magnetic field. Such signals may be provided as frequency codes. The termination of the travel along the offset course at 11, 12 or in the regions of the sectional planes indicated at XIV and XV in FIG. 9 may be effected in various ways, as will become apparent from the following description of a steering means of a vehicle.

The vehicle itself has not been shown. It travels on wheels and may be three-wheeled or four-wheeled. Close to the steerable axle or to a steerable wheel the vehicle is provided with a downardly facing sensor 24, which cooperates with a guide wire, such as 4, and the electromagnetic field surrounding that wire. The sensor 24 is disposed within the contour line 25, which indicates the boundary of the vehicle. The vehicle comprises the steering means 26 including the control head for controlling a drive and a driven wheel which is rotatable about a vertical axis. The steering action will activate the steering motor 27 via a steering signal generator 28.

The sensor 24 is connected by a line 29 to three comparators 30, 31, 32. The line 29 is connected by branches 33, 34, 35 to each comparator. Each comparator is also connected to an associated signal source 36, 37, 38, which applies a predetermined signal parameter to the comparator. The middle comparator 31 receives from the signal source 36 a signal parameter having an intermediate value 0. The signals delivered by the two outer signal sources 37, 38 have mutually opposite polarities and parameters of, e.g., plus 20 and minus 20 and will initiate a travel along a laterally offset course as described hereinbefore when the corresponding signal is delivered to the steering signal generator 28. The leads for the control signals are designated 39, 40, 41 and are all connected to the input 42 of the steering signal generator 28. The control signal leads 39 to 41 include switches 43, 44, 45, which are connected by functional links 47, 48, 49 to a switch control circuit 46, which is connected to a course-selecting circuit 50, which includes a microcomputer, which may be program-controlled.

The course-selecting circuit 50 is connected by the functional link that is shown to a receiver 51, which like the sensor 24 is provided on the vehicle and faces downwardly and is disposed laterally of the guide wire during a normal straight-ahead travel. That receiver can pick up signals from an identification mark 52. The signal flux consisting, e.g., of an inductive action is represented by the dotted line 53. The sensor 24 is influenced by the field established by the guide wire as is indicated by the dotted line 54.

The identification mark may alternatively exert a mechanical or optical action, as has been described. For this reason the item 51 is generally described as a receiver, which term is not restricted to a device for receiving electric or radio frequency signals but covers also a device which is responsive to mechanical pulses as has been described hereinbefore with reference to the prior art.

When the vehicle is travelling along the guide wire and the sensor 24 is receiving signals, the so-called actual offset signal is delivered via line 29 to the comparators 30 to 33. The signals from the identification mark 52 will indicate a straight-ahead travel or a travel along a branch on a laterally offset course. The corresponding signal will be received by the course-selecting circuit 50, which will operate the switch control circuit 46 so that, for instance, from the state corresponding to FIG. 9, the switch 43 will be closed for a straight-ahead travel and one of the switches 44 and 45 will be closed for a travel along the laterally offset course 17 or 18. As a result, the signals received by the sensor will be processed in the manner explained hereinbefore for the control of the steering motor 27.

It will be understood that in case of a branch directed only to one side, as is shown in FIG. 2, only a single switch corresponding to the switch 44 or 45, in dependence on the desired direction, will have to be actuated for initiating a travel along a branch.

It is apparent from FIGS. 2 and 9 that the travel along a laterally offset course will take only a certain time and that the on-board sensor 24 of the vehicle and the vehicle itself will then again be centered over the guide wire. The termination of the travel along the offset course, e.g., at points 11 and 12 in FIG. 2, is determined by a signal that is generated in the vehicle or transmitted from the outside. To effect that termination the switch control circuit 46 is controlled via a functional link 55 by a signal generator 56 for terminating the offset travel. As a result, switches 45, 44 for initiating a laterally offset travel will be opened and the switch 43 for initiating a straight-ahead travel will be closed.

In this embodiment the signal generator 56 can selectively be operated by either of the two switches 57, 58. The switch 58 is connected to a travel transducer 59 on the vehicle. That travel transducer may comprise an idler roller or in vehicles used in industrial warehouses may count the revolutions of a centrally disposed wheel. In that case a travel can be measured because such wheels run on incompressible tires. When the laterally offset travel has been initiated, that travel measurement is initiated by an intermediate functional link 60 extending from the circuit 50. Only thereafter will the travel transducer be operated as a controlling functional signal generator. That signal generator will be enabled by a selector switch 61, which is actuated under the control of the circuit 50.

The travel measurement may be replaced by a time measurement, which is initiated in response to the beginning of a laterally offset travel and after an elapse of a period of time activates the signal generator 56 for terminating the offset travel. Certain uncertainties may occur in that case owing to the condition of the ground on which the vehicle is traveling or of the surfaces of the wheels. For this reason that mode of operation is not described here in detail although it is included.

A reliable signal generation can be ensured by a signal generator which cooperates with an external mark 62 provided on the ground and corresponding to the identification mark 52 that has been described hereinbefore. That mark may be disposed at the point 11 or 12 in FIG. 2 and in dependence on the nature of the associated signal pickup 63 in the vehicle may consist of a mechanically, optically or electrically acting mark. A signal which has been picked up will be delivered by the then closed switch 57 and the line 64 to the signal generator 56 for terminating the offset travel. For a given application the selector switch 61 will be used to determine whether the signal pickup 63 and an external signal source consisting of the external mark will be employed or an internal transducer which corresponds to the travel transducer 59. This will be effected in that either of the switches 57 and 58 is closed.

FIG. 17 shows an industrial truck 65 having a lifting frame 66, in which a load carrier 67 is vertically guided. The industrial truck 65 is provided at one end with two laterally spaced apart wheels 68, which may consist of idler rollers, and is provided at its forward end with a steerable driven wheel 69. The industrial truck also carries a sensor 24, which cooperates with a guiding signal line 4 buried in the ground. The guiding signal line may consist of a guiding element which can be optically or electromagnetically scanned and may particularly consist of a wire, which is buried in the ground and fed with suitable signals.

Identification marks 52 are provided on the ground and are laterally spaced from the center line of the truck and cooperate with a receiver 51 provided in the truck. Outer marks are also provided for cooperation with a signal pickup 63 in the vehicle. It will be understood that the detectors 51 and 63 are provided either in a staggered arrangement on one side of the center line of the vehicle or are provided on different sides of said center line so that they can receive signals from identification marks which are laterally disposed of the guiding signal line, which particularly comprises guide wires, e.g., at least one guide wire 4. The identification marks deliver signals furnishing certain address information. The detectors 51, 63 act to influence the steering of the vehicle in the manner called for by the invention and also influence the drive 71 for the steerable driven wheel 69.

FIG. 18 is a diagrammatic top plan view indicating that the industrial truck generally designated 65 is guided by the centrally disposed on-board sensor 24 along the guiding signal line 4, which consists of a signal wire. The receiver 51 and the signal pickup 63 are provided on opposite sides of the truck at its edges and cooperate with identification marks provided beside the guide wire 4 of the guiding signal line. Such identification marks are spaced from the guide wire 4 of the guiding signal line by a distance which equals the distance from the receiver and the signal pickup 63, respectively, to the center line of the truck 65. Two such identification marks are designated 72 and 73.

Owing to the staggered arrangement of the parts of the identification marks 72, 73, said marks may be used to induce a resetting after a laterally offset travel along a certain distance.

Regarding the mode of operation, only one downwardly facing sensor 24 is associated with a guiding signal line 4. If an identification mark 52 calls for a lateral offset to be effected by the control device 26 for the steering motor 27, the direction of the offset will also be determined by the signal that is delivered by the identification mark 52. That signal may, e.g., be modulated or may be a numerical signal. After a straight-ahead travel beyond the closed switch 43, that latter will be opened and one of the switches 45 and 44 will be closed so that an additional signal from the signal source 37 or 38 will be superposed on the signal that is delivered by the sensor 24. That additional signal may be a positive or negative voltage, in dependence on the direction of the offset, or may be a numerical signal in case of a numerical control.

The positive or negative voltage may be of an order of 10 volts, specifically in case of the signal sources 37 and 38, and the signal source 36 may have a voltage of 5 volts for a straight-ahead travel.

As a result, the steerable driven wheel 69 is steered to one side until the equilibrium has again been established in the comparator 31 or 32.

If a laterally offset travel is initiated by an identification mark, the steering means of the vehicle may be so designed that the steerable wheel 69 will be deflected from the direction of travel through an angle of an order of 30°. From that deflected position the wheel is returned to a parallel position by the comparators 31, 32 in response to the opposing signal delivered by the signal sources 37, 38 until an equilibrium has been established in the steering means.

The equilibrium will be reached when the driven wheel 69 is in position for the offset travel. That offset travel will be continued until a resetting is called for by an identification mark 62 provided at the end of each offset course 17, 18 or by the device 59, which may consist of a travel transducer or a timer. As a result, the signal generator 56 for offset travel delivers a signal to the switch control circuit 46 so that the latter opens the then closed switch 44 or 45 and closes the switch 43 for straight-ahead travel.

In case of a numerical code the vehicle may be provided with a destination code, such as is disclosed in German patent specification No. 2,137,864. If such a destination code is provided it will not be necessary to provide identification marks 72, 73 on both sides as shown in FIG. 18. One identification mark, such as 73, on one side will then be sufficient and only one signal pickup 63 on only one side of the vehicle will be required.

The comparators 30 to 32 will determine the lateral offset for the laterally offset travel in dependence on the signals from the signal sources 36 to 38 which are connected or can be connected to the comparators. The signal parameters are so selected that, e.g., a lateral offset of an order of about 50 mm will be effected.

A timing is less important for the control of the distance traveled than the travel measurement effected by the travel transducer, which for this reason is designated 59.

The travel transducer referred to above may consist of a known device which counts the revolutions particularly of the driven wheel by a summing of increments. Such devices are known.

We claim:

1. A system for guiding industrial trucks having at least one steerable wheel and other wheels consisting of driven wheels or rollers, said system comprising a guiding signal line providing at the ground a trace for emitting radiation in one of the modes consisting of reflection and a field derived from power that is supplied to said line, which guiding signal line constitutes a guiding element, said system also comprising branches extending to the left or right from a straight portion of the guiding element and consisting of arcuate guiding elements, said system comprising special marks in front of each of said branches, said marks being operable in one of the modes consisting of an identification-signal from the ground and a signal modulation of the radiation from the guiding signal line, in which system the industrial truck comprises a sensor centrally scanning said guiding element and for receiving the radiation and circuitry for evaluating the radiation which has been received by said sensors so as to derive signals from said radiation, said industrial truck comprising steering means (26) for controlling a deflection of at least one steerable wheel of said industrial truck, which steering means are operatively connected to the sensor by means for controlling the steering means independence on a signal that has been received by the sensor for causing the steerable wheel to be laterally deflected to a course that is laterally offset from the guiding signal line, the industrial truck further comprising a direction-presetting subassembly for controlling the steerable wheel, said subassembly is presettable by one of the modes consisting of a time measurement and a travel measurement, and means (24, 31, 33, 50, 56) for effecting a control lateral deflection of said steerable wheel are provided and are triggerable by one of said modes, triggering means for triggering said deflection control means are provided and comprise one of the signal generators consisting of an identification mark and means for modulating said radiation, said deflection control means being operable to effect a lateral offset of said steerable wheel from the guide element (4, 5; 15, 16) at the ground and to maintain the offset for a travel along a course that is parallel to the guiding signal line (4, 5; 15, 16).

2. A system according to claim 1, wherein
identification marks are provided at the ground, which identification marks consist of signal generators for emitting an address signal identifying a branch, said industrial truck carries a receiver (51), which is adapted to receive said address signal and in response to said address signal to deliver to the steering means (26) of the industrial truck a controlling signal for deflecting the steerable wheel to a course (9', 10') that is laterally offset from said guiding signal line, and a signal generator is provided at the ground and is adapted to emit a signal for terminating the deflection toward the laterally offset course.

3. A system according to claim 1, wherein said direction-presetting subassembly carried by the industrial truck comprises circuitry for effecting a lateral deflection to a course which is laterally offset 20 to 120 mm from the guiding signal lines.

4. A system according to claim 1, wherein
said industrial truck comprises a timer, which is operatively connected to a signal-generating circuitry, which is adapted to be triggered as the industrial truck has moved onto the branch and which is arranged to be disabled after a predetermined time which is determined by the timer and in response to its disabling delivers a signal to the direction-presetting subassembly to cause the latter to return the industrial truck to a centered position over a guide wire by resetting means for imparting a reverse deflection to the steerable wheel to a normal position relative to the guide wire.

5. A system according to claim 4, wherein
travel control means of the system cooperate with the guiding element to generate a pulse when said steerable wheel has performed a predetermined length of travel, said travel control means are arranged to be triggered as the steerable wheel moves onto a branch and to be disabled after a predetermined length of travel, and resetting means are provided, which are arranged to be triggered in response to the disabling of the travel control means and to guide the industrial truck to a centered position over a guide wire.

6. A system according to claim 1, wherein
a timer is provided and
said industrial truck is provided with a travel-measuring device (59) and a switch (58),
which is adapted to be enabled in dependence on a signal from a signal receiver (51) carried by the industrial truck via a course-selecting circuit (50) and a selector switch (61) and is operable to reset the timer.

7. A system according to claim 1, wherein
said direction-presetting subassembly comprises feelers,
marks are provided at the ground and are disposed laterally of the guiding signal line and consist of an elevation or depression in the surface,
each of said feelers is engageable with at least one of said marks and in response to said engagement to operate said direction-presetting subassembly.

8. A system according to claim 7, wherein
said industrial truck comprises a plurality of drive motors, one of which is a travel drive motor and at least one of which is a steering motor for imparting to said steerable wheel a lateral deflection,
connecting circuitry is provided for operatively connecting said steering motor to at least one of said feelers and comprises a circuit for limiting the time in which a lateral deflection is imparted to said steerable wheel, which circuit comprises control means for returning said direction-presetting subassembly to a position for a travel of such steerable wheel on a straight course.

9. A system according to claim 1, wherein
said direction-presetting subassembly is operable to impart in response to a signal unbalance a predetermined lateral deflection to the steerable wheel by means of said steering means and thereafter to move said steerable wheel by means of said steering means to a position in which said steerable wheel is parallel to said guiding signal line when said signal unbalance has been eliminated,
three comparators (30 to 32) are provided for detecting said signal unbalance, and
said direction-presetting subassembly comprises switchable control signal generators, which control said steering means for a travel of the steerable wheel on a course which is parallel to and laterally offset from the guide wire for a predetermined time or for a predetermined length of travel.

10. A system for guiding industrial trucks having at least one steerable wheel and other wheels consisting of driven wheels or rollers, said system comprising a guiding signal line providing at the ground a trace for emitting radiation in one of the modes consisting of reflection and a field derived from power that is supplied to said line,
which guiding signal line constitutes a guiding element,
said system also comprising branches extending to the left or right from a straight portion of the guiding element and consisting of arcuate guiding elements,
said system comprising special marks in front of each of said branches,
said marks being operable in one of the modes consisting of an identification-signal from the ground and a signal modulation of the radiation from the guiding signal line, in which system the industrial truck comprises a sensor centrally scanning said guiding element and for receiving the radiation and circuitry for evaluating the radiation which has been received by said sensors so as to derive signals from said radiation, said industrial truck comprising steering means (26) for controlling a deflection of at least one steerable wheel of said industrial truck, which steering means are operatively connected to the sensor by means for controlling the steering means independence on a signal that has been received by the sensor for causing the steerable wheel to be laterally deflected to a course that is laterally offset from the guiding signal line, the guiding signal line being adapted to emit a signal for returning the steerable wheel to a course that is centered on the guiding signal line, a direction-presetting subassembly is provided on the industrial truck and is operatively connected to the sensor and said sensor is adapted to receive said resetting signal from said signal line and in response to said resetting signal to cause said direction-presetting subassembly to reset the at least one steerable wheel.

11. A system for guiding industrial trucks having at least one steerable wheel and other wheels consisting of driven wheels or rollers, said system comprising a guiding signal line providing at the ground a trace for emitting radiation in one of the modes consisting of reflection and a field derived from power that is supplied to said line, which guiding signal line constitutes a guiding element, said system also comprising branches extending to the left or right from a straight portion of the guiding element and consisting of arcuate guiding elements, said system comprising special marks in front of each of said branches, said marks being operable in one of the modes consisting of an identification-signal from the ground and a signal modulation of the radiation from the guiding signal line, in which system the industrial truck comprises a sensor centrally scanning said guiding element and for receiving the radiation and circuitry for evaluating the radiation which has been received by said sensors so as to derive signals from said radiation, said industrial truck comprising steering means (26) for controlling a deflection of at least one steerable wheel of said industrial truck, which steering means are operatively connected to the sensor by means for controlling the steering means independence on a signal that has been received by the sensor for causing the steerable wheel to be laterally deflected to a course that is laterally offset from the guiding signal line, said industrial truck carries a terminating signal generator (56) for generating a signal for terminating the travel of the steerable wheel on the laterally offset course and a course-selecting circuit (50), said course-selecting circuit (50) is adapted to be connected to the terminating signal generator (56) via a change-over switch that is controlled by one of the signal generators consisting of an external identification mark (62) and a controller for measuring one of the parameters consisting of the length of travel and time.

* * * * *